US005228554A

United States Patent [19]

Kuchta et al.

[11] Patent Number: 5,228,554

[45] Date of Patent: Jul. 20, 1993

[54] MATERIAL TAKE-OFF RAMP AND SYSTEM FOR A CONVEYOR CUTTER BED AND METHOD OF USE

[75] Inventors: Richard Kuchta, Vernon; Vladimir Evenzon, Vernon; Joseph R. Vivirito, South Windsor, all of Conn.

[73] Assignee: Gerber Garment Technology, Inc., Tolland, Conn.

[21] Appl. No.: 763,358

[22] Filed: Sep. 20, 1991

[51] Int. Cl.[5] .......... B65G 15/18

[52] U.S. Cl. .......... 198/635; 198/689.1; 198/699.1; 83/23; 83/941; 83/155.1

[58] Field of Search .......... 83/23, 56, 936–941, 83/155, 155.1, 76.1; 198/600, 689.1, 699.1, 635

[56] References Cited

U.S. PATENT DOCUMENTS

| | | | |
|---|---|---|---|
| 2,151,703 | 3/1939 | Kaplan | 83/23 |
| 2,237,345 | 4/1941 | Frentzel, Jr. et al. | 198/600 |
| 4,322,993 | 4/1982 | Stumpf | 83/941 |
| 4,646,911 | 3/1987 | Pearl et al. | 271/197 |
| 5,042,339 | 8/1991 | Gerber | 83/940 |

FOREIGN PATENT DOCUMENTS

| | | | |
|---|---|---|---|
| 0461684 | 5/1926 | Fed. Rep. of Germany | 198/600 |

*Primary Examiner*—Frank T. Yost
*Assistant Examiner*—Allan M. Schrock
*Attorney, Agent, or Firm*—McCormick, Paulding & Huber

[57] ABSTRACT

A cutter for cutting closed shape pieces into sheet material has a bristle bed conveyorized member advancing the sheet material from a receiving end to a discharge end past a cutting tool performing a cutting operation on the material. Disposed at the discharge end is a take-off ramp responsible for separating the sheet material in a single ply or a layup form from the underlying conveyor member at the juncture where the slats making up the bed depart from the upper run of the conveyor defining the support surface.

19 Claims, 3 Drawing Sheets

MATERIAL TAKE-OFF RAMP AND SYSTEM FOR A CONVEYOR CUTTER BED AND METHOD OF USE

CROSS REFERENCE TO RELATED APPLICATIONS

This application relates to co-pending U.S. application Ser. No. 07/681,860, entitled COMBINED CUTTING MACHINE AND TAKE-OFF TABLE of Lawrence S. Wolfson filed on Apr. 5, 1991, which application being commonly assigned with the assignee of the present invention, Gerber Garment Technology, Inc. The application further relates to now U.S. Pat. No. 5,042,339 issued to H. Joseph Gerber on Aug. 27, 1991, which patent being also commonly assigned with the assignee of the present invention.

BACKGROUND OF THE INVENTION

The present invention relates to a means for a guiding material off a conveyorized cutter bed surface and onto a receiving table or the like, and deals more particularly with a takeoff ramp located at the discharge end of the cutter bed and cooperating with the sheet material as it is advanced by the conveyor for readily separating the sheet material from the conveyorized surface without damaging it.

Conveyorized vacuum tables for feeding sheet material are well known in the art of garment making. Such tables are comprised of a conveyor belt having sections or slats carrying penetrable bristles which form a bed for supporting sheet material. The belt is also comprised of chains and sprockets which propel the slats in a given advancement direction. Cut limp sheet material advanced from such conveyor tables have many various ways of being handled. One such way is disclosed in U.S. Pat. No. 4,646,911, issued to Pearl et al. on Mar. 3, 1987, which patent being commonly assigned with the assignee of the present invention. This patent discloses advancing sheet material after being cut off the discharge end of the table and into a collecting hopper 25 located below the surface of the table. The sheet material is thus caused to simply fall from the table after reaching the end. However, in other applications, such as disclosed in co-pending U.S. application Ser. No. 07/681,860, it is desirable to advance the cut sheet material off the conveyorized bed such that it remains substantially flat and almost maintained within the same plane occupied during its cutting to allow cutting of sheet material pieces wherein a first portion of a piece can be cut, the conveyor advanced, and then a second portion of the same piece cut, as disclosed in aforementioned U.S. Pat. No. 5,042,339. One benefit of this arrangement is that the work piece remains at a height suitable for handling by an operator. For this purpose, a take-off conveyor or table may be provided at the discharge end of the bed such that the cut pattern piece or pieces and the waste material which surrounds these pieces collect there rather than being discharged downwards into a bin. One problem associated with the transfer of sheet material from the discharge end of the conveyorized bed onto a take-off table surface located generally in line with the supporting surface of the bed is that sheet material, in particular a single limp ply, is often held at least in part by the bristles of the last slat as it breaks from the supporting surface drawing it downwards from that surface. Often the results are adverse with the garment piece becoming misaligned or even torn due to this nonuniform advancement.

Accordingly, it is an object of the present invention to provide a means located at the discharge end of a conveyorized cutter bed so that sheet material can be advanced off the bed and continue in this direction generally along the same path taken in its advancement during the cutting operation without causing misalignment and/or damage to the material being handled.

In keeping with the foregoing object, a more specific object of the invention is to provide a take-off ramp of the aforementioned type having means engaging with the bristle bed for providing a ramping surface onto which a sheet or sheets of limp material are readily separated from the surface which supports it during cutting without causing the sheet material to continue in a downward travel path of the endless conveyor which moves it.

Yet a further object of the present invention is to provide a highly reliable take-off ramp adaptable to be used with any type of take-off table receiving sheet material advanced off the discharge end of a conveyorized cutter bed.

Other objects and advantages of the present invention will become apparent from the following disclosure and the appended claims.

SUMMARY OF THE INVENTION

The invention resides in a take-off ramp provided in a conveyorized cutter bed assembly comprised of a moveable conveyor member supported on a frame having an upper run extending between a first location and a second location on the frame. The conveyor member is defined by a plurality of units linked with one another to form an endless loop such that the upper run defines a moving support surface disposed in a given plane and extending between the first and the second locations. The units each include a multiplicity of bristles extending upwardly therefrom to define the support surface and an underlying permeable bed when the units are disposed along the upper run. A means is provided for driving the conveyor member to move the units in an endless loop through the first and the second locations, with the first location being associated with an input end of the conveyor member and the second location being associated with a discharge end of the conveyor member. The take-off ramp is supported by the frame generally at the second location and is so positioned relative to the conveyor member that it extends below the supporting surface and partially within the bed. The take-off ramp terminates at its end within the bed at a point along the upper run of the conveyor member where the units initially depart from an otherwise straight path followed along the upper run.

The invention further resides in a method of separating sheet material carried along the conveyorized bristle bed comprising the steps of providing a support surface having a length defined by units of the conveyor member which define its upper run; providing a take-off ramp at the discharge end of the conveyor member having a plurality of fingers extending parallel to the advancement direction followed by the conveyor member; supporting the plurality of fingers relative to the conveyor member such that the leading ends of the fingers lie within the bed below the supporting surface substantially coincidentally with the plane containing the break point between adjacent units where they are diverted from the upper run and spacing the fingers from the other as to allow sheet material to be driven upwardly on the ramp along at least the leading length of each the fingers.

DETAILED DESCRIPTION OF THE PREFERRED EMBODIMENT

Figure 1:
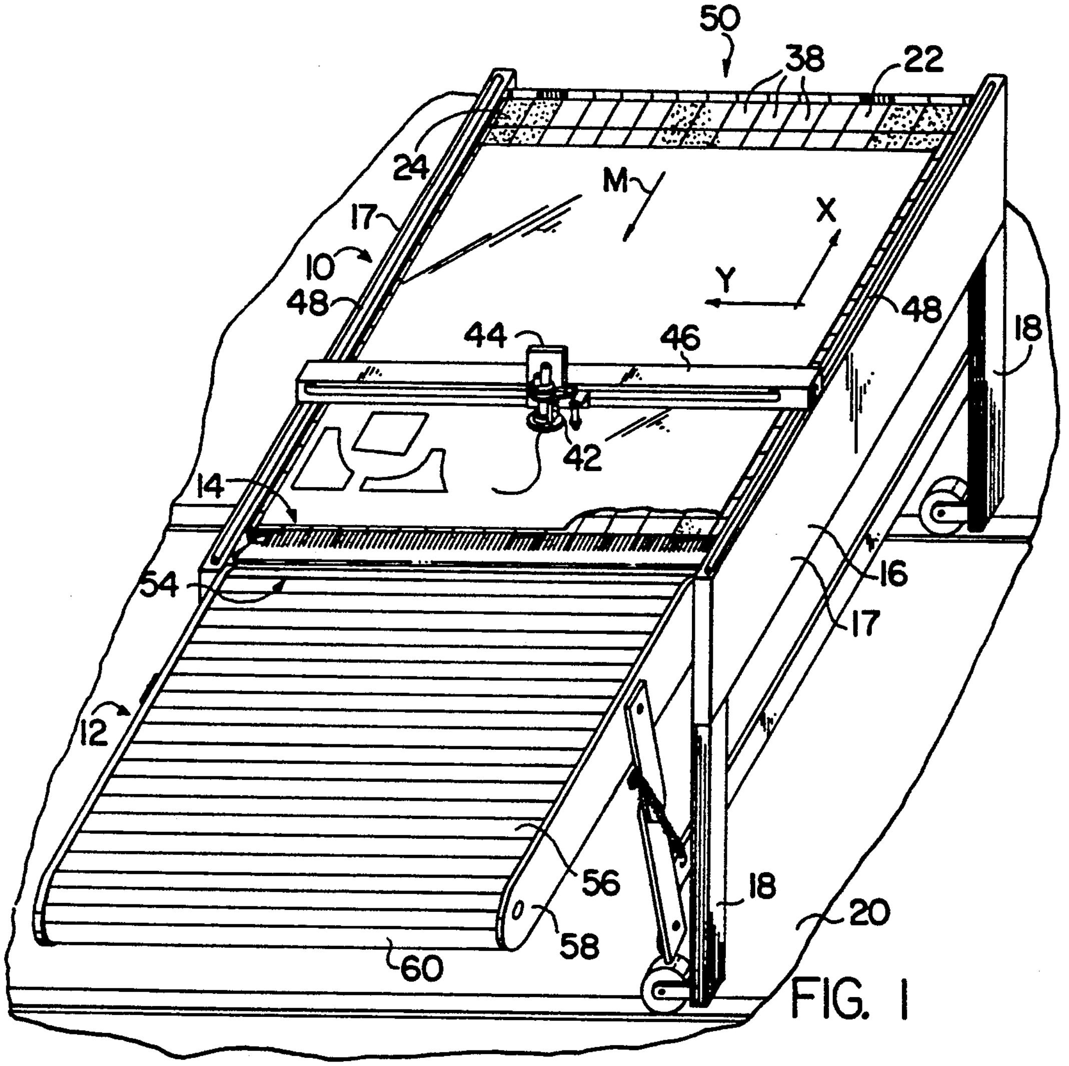
FIG. 1 is a perspective view showing the cutting machine in which the present invention is embodied.

FIG. 1 illustrates a cutting machine 10 combined with a take-off table 12 having a take-off ramp 14 interposed therebetween in accordance with the invention. The details of the construction of both the cutting machine 10 and the take-off table 12 may vary widely without departing from the invention and for purposes of illustration, the take-off table 12 is shown as being conveyorized, but may alternatively simply be a flat surface.

The cutting machine 10 includes a frame 16 supported by a number of legs 18 above a floor 20, which legs may include rollers or casters provided for the purpose of allowing the machine to be wheeled to different stations on the floor. The frame 16 of the cutting machine 10 is defined in part by two longitudinally extending side walls 17,17 carrying a means providing an upwardly facing flat support surface 22 located in a horizontal plane H for supporting sheet material to be cut. This means includes an endless conveyor member 24 trained over rotatable end units located at opposite ends of the frame, one of which end units is shown schematically at 26 in FIG. 4 as a sprocket. Each sprocket is so oriented relative to the conveyor member 24 as to form in it an upper run 28 defining the support surface 22. The inner face of the conveyor member 24 is essentially a link-belt or chain 30 and each of the end sprockets 26,26 is formed with radially outwardly extending teeth 32,32 adapted to coengage with the links 34,34 of the chain 30. The sprockets 26 are driven in rotation by a drive motor 27 shown schematically at 27 which is drivingly connected to at least one of the sprockets by a positive drive power transmitting means.

The conveyor member 24 moves in the direction indicated by the arrow M in FIG. 1 parallel to the illustrated X-coordinate direction upon the normal forward operation of the drive motor. In the illustrated embodiment, the conveyor member 24 is comprised of a number of slats 36,36 extending in the illustrated Y coordinate direction transversely of the frame 14 and linked to one another about a hinge axis also extending transversely to the frame to form the continuous chain or belt 30. As best seen from FIG. 4, each slat 36 includes a base portion 37,37 which carries a number of bristle blocks 38,38 which when positioned in the upper run 28 of the conveyor member 24 have upwardly extending bristles terminating in the common plane H to form the supporting surface 22. The bristles form a bed which is penetrable by a cutting knife and which may also be used to contain a vacuum pressure communicating with the support surface to aid in holding and compressing the material to be cut. In the case where a vacuum source is provided, the vacuum is caused to communicate with individual slats through the intermediary of a common vacuum manifold. For a more detailed description of such a manifold, reference may be had to aforementioned U.S. Pat. No. 4,646,911.

Between each slat is provided a barrier strip 39,39 extending laterally along the entire length of the slat to prevent leakage of air in the X-coordinate direction through the bristles from one slat to the next. The barrier strips are sufficiently tall to extend from the base 37 of each slat outwardly to the plane containing the tips of the bristles. Each barrier strip is attached to the base portion 37 of its associated slat by an appropriate adhesive leaving its remaining height to deflect from an otherwise straight orientation. The strips may be formed from any number of flexible, air-impermeable materials, such as MYLAR, for this purpose.

The material 40 to be cut may consist of a single layer spread fabric or other sheet material or may alternatively comprise a layup consisting of a number of sheets of fabric or other sheet materials spread on top of one another. In either case, the take-off ramp of the present invention is suitably adapted to effectively separate sheet material in either a single ply or layup form from the conveyor member 24 which advances it. Also, a sheet of thin air permeable material may be spread over the top of the layup or single ply sheet 40 in a well known way with vacuum applied to the support surface 22 to compress the material of the layup against the support surface to condition it for better cutting.

For cutting the sheet material 40 when supported by the surface 22, the cutting machine includes a cutting head 42 having a vertically reciprocating knife which during a portion of its stroke has its lower end plunged below the support surface 22 and into the bed formed by the bristle blocks 38,38. The cutter head 42 is carried by a Y carriage 44 movable in a Y-coordinate direction relative to an X carriage 46. The X carriage 46 extends transversely over the supporting surface 22 and is supported at its opposite ends on guide rails 48,48 fixed relative to the machine frame 14 and extending longitudinally thereof in the indicated X coordinate direction. The X and Y carriages are driven along their respective axes by drive motors (not shown) controlled by an associated controller (not shown) to drive the X and Y carriages 44 and 46 in coordinated movements to follow lines of cut required to produce a desired pattern piece.

In use, the cutting machine 10 is brought along side a spreading table having a quantity of work material ready to be cut placed on it. The cutting machine 10 is positioned so that its input end 50 is located adjacent one end the spreading table. The work material is thereafter moved from the spreading table onto the support surface 22 of the machine. Once a portion of the work material is placed down on the support surface 22, the conveyor member 24 may be driven in the advancement direction M to aid in pulling the sheet material from the spreading table onto the surface 22. Vacuum at this point is preferably applied to the surface 22 to more positively bind the sheet material to the conveyor 24 before it is advanced thereby minimizing slippage between the sheet material and the conveyor member. It should be appreciated that in FIG. 1 the sheet material 40 is shown to have a length less than that of the support surface 22 and to have been moved all at once onto the support surface. However, work material having a longer length than that shown in FIG. 1 is used and is advanced portion by portion onto the support surface from a spreading table during a cutting operation.

At the discharge end 54 of the machine 10, is located the take-off table 12 serving to receive the sheet material 40 from the support surface after it has been cut by the cutter head 32. The table 12 includes a frame 58 supporting a upwardly facing flat support surface 56 located in, or at least substantially in, the same horizontal plane P defined by the supporting surface 22. The take-off table has a supporting surface 56 which thus essentially forms a continuation of the machine's supporting surface 22 so that after work material has been cut by the cutting machine it may easily be transferred to the supporting surface 56 of the cutting table by moving the material forwardly in the direction of the arrow M aided in its advancement by the take-off ramp 14 provided in accordance with the present invention. The support surface 56 of the take-off table 12 may be constituted by various different structures, but in the illustrated embodiment it takes the form of a conveyor member 60 rotatably carried by the frame 58 and formed from a number of plastic links hingedly linked to one another about axes extending transversely to the table 12 in the Y-coordinate direction.

Figure 2:
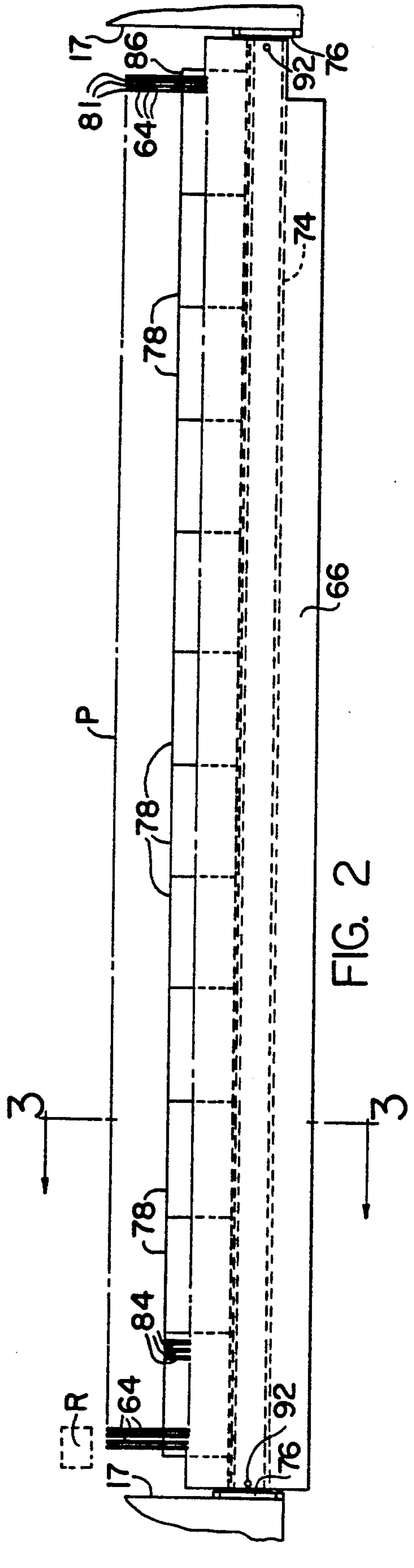
FIG. 2 is a partially fragmentary plan view of the take-off ramp as seen at the discharge end portion of the cutting machine shown in FIG. 1 with the take-off table removed.
Figure 3:
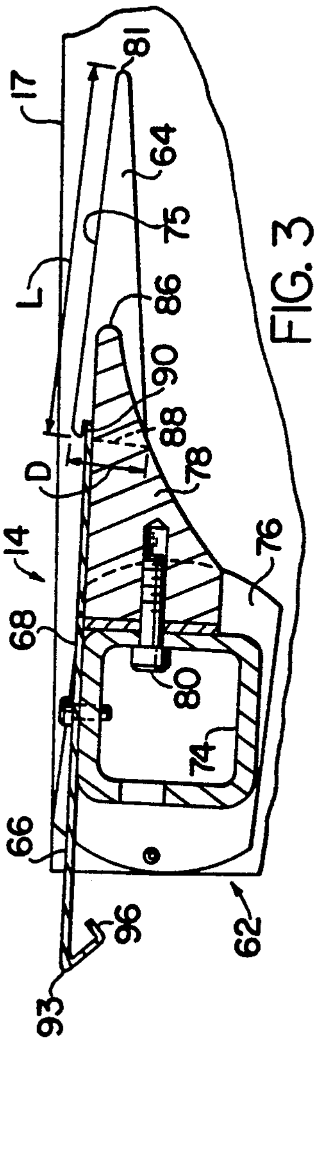
FIG. 3 is a partially fragmentary vertical sectional view taken along line 3—3 in FIG. 2.
Figure 4:
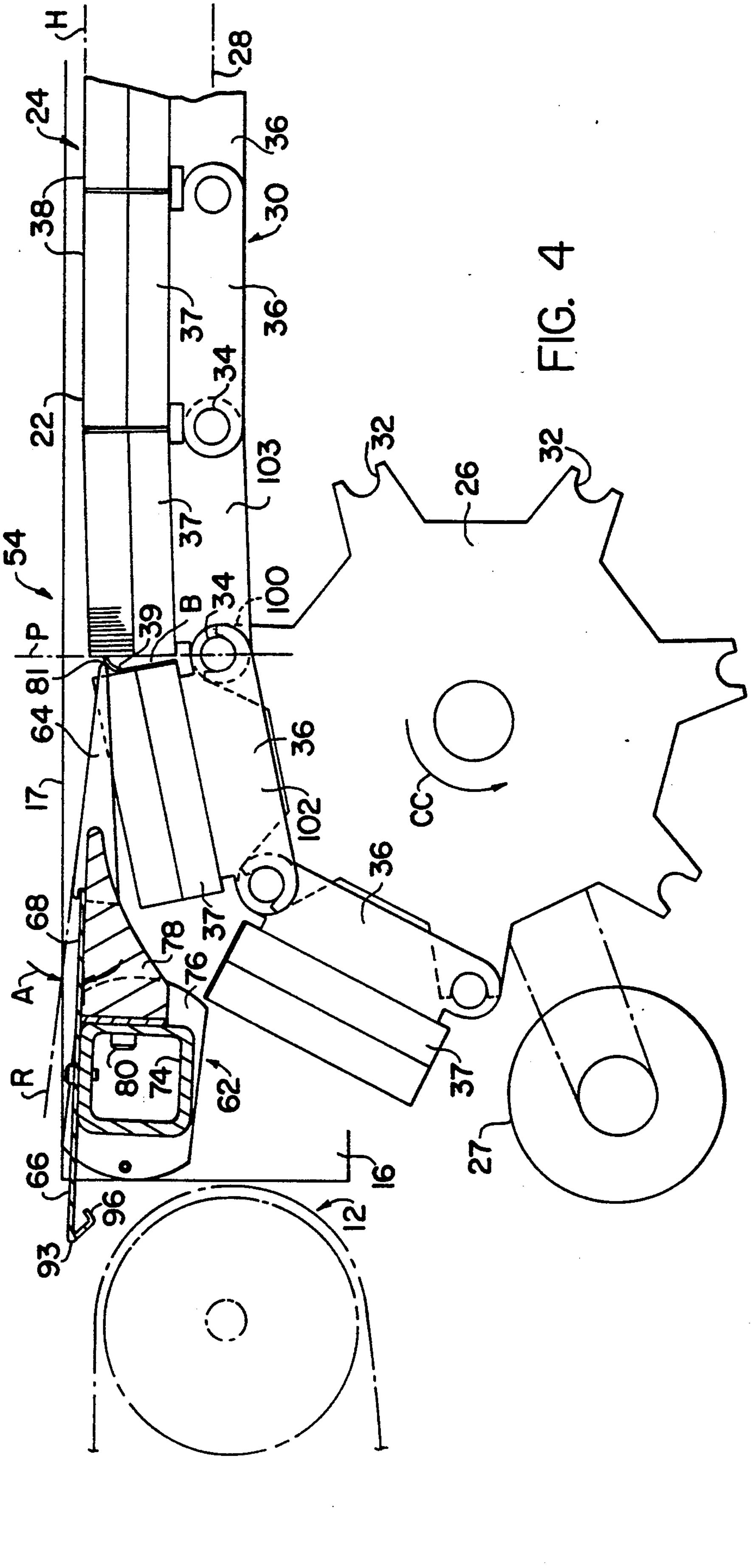
FIG. 4 is partial fragmentary vertical section taken through the cutting machine.

Referring now to FIGS. 2 through 4 and in particular to the take-off ramp 14 embodying the present invention, it should be seen that the ramp is secured to the frame 16 at the discharge end 54 by a means 62 supporting it above the plane H defined by the surface 22. To this end, the means 62 includes a mounting bar 74 for supporting the ramp, and the frame 16 at the end 54 is configured such that the lateral side walls 17,17 extend longitudinally further beyond the conveyor member 24 so as to provide a generally U-shaped end space. Within this end space the mounting bar 74 extends transversely between the lateral support walls 17,17 in the indicated Y coordinate direction and is so positioned heightwise relative to the plane H as to slightly protrude above it. The bar 74 may take various different cross-sectional shapes, but in the preferred embodiment it has a generally square cross-section in tubular form secured at each of its ends to one of the walls 17,17 through the intermediary mounting plates 76,76.

The ramp 14 is comprised of a plurality of spaced fingers 64,64 extending longitudinally of the table parallel to the advancement direction M and are so supported by the mounting bar 74 as to extend into the surface 22 through the plane H. Each of the fingers 64,64 is secured to the mounting bar 74 through the intermediary of a number of holding blocks 78,78 which maintain the fingers in a row extending across the entire width of the supporting surface 22. The holding blocks 78,78 are secured to the mounting bar 74 by an appropriate securement means, such as a threaded fastener 80 engaged within each block in a corresponding threaded opening. By using a plurality of such holding blocks, slight adjustments can be made to the fingers through the use of shims interposed between the bar and the blocks to accomodate irregularities that may exist in the surface 22. The fingers 64,64 have a length L equalling approximately 4.25 inches and a depth D of approximately 1.0 inch and each has a thickness measured across the side faces thereof equally approximately ⅛ inch. As arranged on the holding blocks, the spacing between fingers 64,64 ranges between ⅛ and ¼ of an inch and although interrupted by such spacing, the upper edges 75,75 of the fingers 64,64 present to an advancing sheet material sheet, a generally uniform ramping surface as will hereinafter become apparent.

As seen in FIG. 3, the holding blocks 78,78 maintain the plurality of fingers 64,64 in a row with one another such that the distal or leading ends 81,81 of each of the fingers lie substantially in a vertical common plane P and the upper edges 75,75 thereof are disposed in another common plane defining a ramping surface R. For uniformly orienting the plurality of fingers 64,64 in this manner, each of the holding blocks 78,78 may be formed with a series of cuts 84,84 extending longitudinally into them starting from the leading edge 86 thereof and ending in an inwardly disposed wall 88 abutting the back edge of the involved finger. The fingers are in turn held in place within the blocks by a suitable adhesive, such as LockTight Brand Adhesive, Number 730. The holding blocks may be formed from any number of different metals, but in the illustrated embodiment the blocks are made of aluminum. Alternatively, the holding blocks can be in-place injection molded around the fingers 64,64 arranged in a row and held within the mold in a desired angular orientation.

The ramp 14 also includes a bridging piece 66 mounted on the support means 62 rearwardly of the fingers and has an upwardly facing intermediate surface 68 extending between the cutter surface 22 and the take-off table surface 56. Each of the fingers 64,64 along the back edge thereof may be notched at 90 so as to collectively provide a recess into which the bridging piece 66 is received. The bridging piece 66 is secured to the top face of the support bar 74 at its opposite side edges at locations 92,92 laterally outwardly oriented from the path followed by the sheet material 40 as it is moved across the bridging piece 66. The end of the bridging piece 66 opposite that which is received within the notches 90,90 may be downturned at 93 to provide a lip 96 adapted for receiving the top surface 56 of the take-off table 12.

Referring now to FIG. 4, it should be seen that the fingers 64,64 are so disposed on the frame 16 as to cooperate with the support surface 22 during the advancement of the conveyor member 24 to effect the smooth transfer of sheet material off the surface 22 and onto the take-off ramp 14. To this end, the fingers are mounted to the frame 16 such that the plane R which includes the upper edges 75,75 of the fingers is slightly inclined relative to the support surface plane H at the indicated angle A equalling about 5 degrees so as to dispose the leading ends 81,81 of the fingers 64,64 below the plane H and within the bed. Furthermore, the plane P which includes the leading ends 81,81 of the fingers 64,64 is located at a point along the upper run 28 where the slats are first diverted from their otherwise planar path to follow the arcuate path around the discharge end sprocket 26. That is, the sprocket tooth shown in FIG. 4 as 100 is immediately within the run 28 and upon continued rotational movement of the sprocket in the indicated CC direction, it causes the slat associated with it to turn downwards along an arcuate path out of the horizontal plane H. In the illustrated example, the slat 102 has already been diverted from the upper run 28 such that a break B is formed between it and the following slat 103. As can be seen, the length L of the fingers 64,64 is selected such that the leading ends 81,81 occupy the gap formed by the break B thus automatically supporting the limp sheet material otherwise falling into it during conveyor advancement. Also, the barrier strips 39,39 are each secured to the base 37 of the slats 36,36 along the trailing side thereof thereby allowing the unattached portion of the strip to be readily deflected backwards by engagement with the leading ends 81,81 of the fingers. This is a departure from the previous manner in which the barrier strips were used in such cutting machines as disclosed in the aforementioned U.S. Pat. No. 4,646,911 wherein the barrier strips attach to the leading rather than the trailing side of the slats. The thickness of the fingers is selected such that they readily mesh with the upstanding advancing bristles in a comb-like manner and during this meshing the bristles of downwards turning slat 102 move with both a downward and a horizontal directional component so as to effectively carry the involved portion of the sheet material onto the ramp 14. Sliding of the sheet material on the upper edges 75,75 of the fingers 64,64 may be further aided by coating them with a suitable low friction finish, for example with nickel plating. Likewise, the surface 68 of the bridging piece 66 is preferably a highly polished metal which likewise may be coated to give a highly smooth finish. In this manner, limp single sheet material may be readily advanced off the conveyor member 24 and onto the take-off table 12 for subsequent handling by an operator.

By the foregoing, a take-off ramp for enabling the discharge of a sheet material from one end of a cutting machine has been disclosed in the preferred embodiment. However, numerous modifications and substitutions may be had without departing from the spirit of the invention. For example, the support means 62 for the ramp 14 is disclosed in the preferred embodiment as a bar extending transversely of the machine and secured to the side walls, but may alternatively be constituted by brackets.

Accordingly, the invention has been described by way of illustration rather than by limitation.

I claim:

1. A conveyorized cutter bed assembly comprising:

a frame;

a moveable conveyor member supported on said frame having an upper run extending between a first location and a second location on the frame;

said conveyor member being defined by a plurality of units linked with one another to form an endless loop such that said upper run defines a moving support surface disposed in a given plane and extending between said first and said second locations;

said units each including a multiplicity of bristles extending outwardly therefrom to define said support surface and an underlying permeable bed when said units are disposed along said upper run, said units each having a leading and a trailing side extending transversely to the direction of said conveyor member movement, said leading side of each unit when disposed in said upper run being oriented closer to said second location than the trailing side of the same unit;

a means for driving said conveyor member to move said units in an endless loop through said first and said second locations;

means for providing vacuum to the ones of said plurality of units that are caused to move along said upper run;

said first location being associated with an input end of said conveyor member and said second location being associated with a discharge end of said conveyor member;

means connected with the trailing side of each of said plurality of units for preventing leakage of vacuum between consecutively ordered units; and ramp means supported on said frame generally coincidentally with said second location, said ramp means having a length extending in the direction of conveyor movement selected such that a part of the said ramp means extends below said supporting surface and partially within said bed, said ramp means terminating at its ends within said bed substantially at a point along said upper run of said conveyor member where said units initially depart from an otherwise straight path followed along said upper run so as to engage the leakage preventing means of the associated unit moving through said ramp means and to cause a portion of the engaged leakage preventing means to be deflected rearwardly by ends of said ramp means to cause localized pressure relief in the vicinity of the ends of said ramp means to better allow the transport of material off the conveyor member and onto the ramp means.

2. A conveyorized cutter bed assembly as defined in claim 1 further characterized in that said ramp means is defined by a plurality of fingers extending parallel to the direction in which said conveyor member is moved and spaced a given distance from one another so as to allow bristles to pass therebetween.

3. A conveyorized cutter bed assembly as defined in claim 1 further characterized in that each of said fingers has a leading end and upwardly extending edges, said fingers being arranged in a row extending entirely across said moving support surface transversely of its travel direction such that the leading ends of each of said fingers lie substantially in one common plane with one another and the upwardly extending edges being disposed in another common plane oriented at a slight inclination relative to the support surface.

4. A conveyorized cutter bed assembly as defined in claim 3 further characterized in that each of said units includes a base portion and said means for preventing leakage of vacuum between consecutively ordered units includes a barrier strip attached to the base portion of each unit such that each of said barrier strip extends upwardly therefrom so as to be deflected by said fingers when said units move through said one common plane.

5. A conveyorized cutter bed assembly defined in claim 4 further characterized in that said frame includes two lateral side walls extending longitudinally of said conveyor member beyond said second location to define a generally U-shape area; and wherein said ramp means includes a mounting bar extending laterally between said lateral side walls for positioning said fingers in given orientation relative to said conveyor member.

6. A conveyorized cutter bed assembly as defined in claim 5 further characterized in that said plurality of fingers are each connected to the mounting bar through the intermediary of at least one holding block secured to the bar at one end thereof and holding the fingers at the other opposite end thereof; and wherein said fingers are coated to aid sheet material to slide thereon.

7. A conveyorized cutter bed assembly as defined in claim 6 further characterized in that said assembly includes a take-off table received within said generally U-shaped area; and said take-off table having an upwardly facing surface extending substantially coplanar with said supporting surface of said conveyor member.

8. A conveyorized cutter bed assembly as defined in claim 7 further characterized in that said ramp means further includes a intermediate member disposed between said fingers and said take-off table so as to provide a path along which sheet material is slid as it is advanced off said conveyor member and on to said take-off table.

9. A conveyorized cutter bed assembly as defined in claim 6 further characterized in that each of said fingers is received within said at least one holding block, and the at least one holding block is in-place injection molded around said fingers.

10. A conveyorized cutter bed assembly as defined in claim 6 further characterized in that each of said fingers is received within slots cut into said at least one holding block and are adhesively secured thereto.

11. A conveyorized cutter bed as defined in claim 10 further characterized in that said plurality of fingers each include a notched portion sized and shaped to receive one end of said intermediate member therein.

12. In a cutter machine of the type of having a moving conveyor member made up of a plurality of units linked to one another between a first initial input location and a second final discharge location across an upper run to define a moving support surface made up of bristles, said units each having a leading and a trailing side extending transversely to the direction of movement of the conveyor member, said leading side of each unit when disposed in said upper run being oriented closer to said second location than the trailing side of the same unit;

a take-off ramp for separating sheet material carried by said conveyor member comprising:

a support means supporting said ramp at a location disposed above said moving support surface;

a plurality of elongate fingers defining said take-off ramp each supported by said support means so as to extend therefrom parallel to the direction in which said conveyor member moves;

means for providing vacuum to the ones of said plurality of units that are caused to move along said upper run;

means connected with the trailing side of each of said plurality of units for preventing leakage of vacuum between consecutively ordered units;

said fingers extending in a row transversely of the travel direction of said conveyor member and being located at the discharge end thereof and being so positioned relative to said conveyor member and having lengths selected so as to extend below said supporting surface and partially within said bed, said fingers terminating at their ends within said bed substantially at a point along said upper run of said conveyor member where said units initially depart from an otherwise straight path followed along said upper run so as to engage the leakage preventing means of the unit moving through said fingers to cause a portion of the leakage preventing means to be deflected rearwardly by the ends of the fingers to cause localized pressure relief in the vicinity of the ends of the fingers to better allow transport of material off the conveyor member and onto the row of fingers.

13. A combination as defined in claim 12 further characterized in that said convey member is comprised of a plurality of units each having a base portion carrying a multiplicity of bristles; and wherein said means for preventing leakage of vacuum between consecutively ordered units includes said leakage preventing means which includes a barrier strip attached along the base portion thereof at its trailing edge so as to allow the strip to be deflected rearwardly when engaged by said plurality of fingers.

14. A combination as defined in claim 13 further characterized by said take-off ramp includes an intermediate piece supported on said support bar and connected to said fingers, said intermediate piece having an upwardly facing support surface slightly inclined taken relative to the support surface defined by said conveyor member.

15. A method of separating sheet material carried along a conveyorized bristle bed comprised of a plurality of units linked to one another to form an upper run extending between a first location corresponding to an input end of said bed and a second final location corresponding to a discharge end of the bed, each of said units having a leading and a trailing side extending transversely to the direction of unit movement, said units together defining a permeable supporting surface, said units when disposed in said upper run having the leading side thereof being oriented closer to said second location than the trailing side of the same unit, said method comprising the steps of:

providing a support surface having a length defined by units of said conveyor member which define its upper run;

providing a take-off ramp at the discharge end of the conveyor member having a plurality of fingers extending parallel to the advancement direction followed by said conveyor member;

providing means for providing vacuum to the ones of said plurality of units that are caused to move along said upper run;

providing means associated with each of said plurality of units at the trailing sides thereof for preventing leakage of vacuum between consecutively ordered units;

supporting said plurality of fingers relative to said conveyor member and selecting the lengths of said fingers such that the leading ends of said fingers lie within the bed below the supporting surface substantially coincidentally with the plane containing the break point between adjacent units where they are diverted from said upper run such that the ends of said fingers engage the leakage preventing means of the unit moving through said plurality of fingers to cause the leakage preventing means to be deflected rearwardly by the ends of the fingers to effect localized pressure relief in the vicinity of the ends of said fingers to better allow transport of material off said bed and onto said ramp.

16. A method as defined in claim 15 further characterized by providing as said means for preventing leakage of vacuum between consecutively ordered units a barrier strip and attaching said barrier to the base of each of said units with the remaining portion of said strip extending upwardly with the bristles and ending in the plane containing said supporting surface; and advancing said conveyor member such that the leading ends of each of said fingers engages with the barrier strip and deflects is simultaneously with the diverting of one unit from the upper run.

17. A method as defined in claim 16 further characterized by providing means which supports said fingers such that said fingers at their leading edges are embedded within the support surface and present a gradual angle of inclination on which the sheet material may ride.

18. A method as defined in claim 17 further characterized in that said angle of inclination is approximately 5 degrees.

19. A method as defined in claim 16 further characterized in that each of said fingers is spaced from the other and is so disposed relative to said point where said units brake from said upper run as to allow sheet material to be driven upwardly on said ramp along at least the leading length of each said fingers.

* * * * *